United States Patent [19]
Hartley

[11] Patent Number: 5,705,018
[45] Date of Patent: Jan. 6, 1998

[54] MICROMACHINED PERISTALTIC PUMP

[76] Inventor: Frank T. Hartley, 529 E. Las Flores Ave., Arcadia, Calif. 91006

[21] Appl. No.: 572,186

[22] Filed: Dec. 13, 1995

[51] Int. Cl.$^6$ ............................................. B44C 1/22
[52] U.S. Cl. .................. 156/345; 156/630.1; 156/657.1; 216/2; 216/33
[58] Field of Search .................. 156/345, 630.1, 156/657.1, 662.1; 216/2, 33, 41; 417/474, 477, 480

[56] References Cited

U.S. PATENT DOCUMENTS

| | | |
|---|---|---|
| 4,794,370 | 12/1988 | Simpson et al. |
| 5,380,396 | 1/1995 | Shikida et al. ................... 156/630.1 |
| 5,585,011 | 12/1996 | Saaki et al. ................... 216/33 |

OTHER PUBLICATIONS

Preprint of "Design, Fabrication & Testing of a Miniature Peristaltic Membrane Pump," by James A. Folta et al., Apr. 1992, prepared for Proceedings of the IEEE Solid State Sensor and Actuator Workshop, Hilton Head Island, South Carolina, held Jun. 21–25, 1992.

"Design, Fabrication & Testing of a Miniature Peristaltic Membrane Pump," by James A. Folta et al., pp. 186–189, Apr. 1992, Lawrence Livermore National Laboratory, California.

"A Piezo–Electric Pump Driven by a Flexural Progressive Wave," pp. 110–113, by Shun–ichi Miyazaki et al., Seventh International Conference on Solid State Sensors and Actuators, held at Yokohama, Japan, on Jun. 7–10, 1993.

"A Novel Piezoelectric Valve–Less Fluid Pump," by Erik Stemme et al., 7th International Conference on Solid State Sensors & Actuators, pp. 110–113, Yokohama, Japan, Jun. 7–10, 1993.

"Performance Simulation of Microminiaturized Membrane Pumps," by R. Zengerle, et al., Fraunhofer Institute for Solid State Technology, Munich, Germany.

"Peristaltic Pumpting," by M.Y. Jaffrin et al., 1971, Department of Mechanical Engineering, Institute of Technology, Cambridge, Massachusetts.

"Piezoelectric Micropump with Three Valves Working Peristaltically," by Jan G. Smist, Sensors and Actuators (1990), pp. 203–206.

"A Micro Membrane Pump with Electrostatic Actuation," by R. Zengerle et al., Micro Electro Mechanical Systems '92, Travemunde, Germany, Feb. 4–7, 1992.

"Electrohydrodynamic Pumping and Flow Measurement," by A. Richter et al., pp. 271–276, Proceedings of the IEEE Micro Electro Mechanical Systems, Application of Micro Structure, Sensors, Actuators, Machines and Robots, Nara, Japan, Jan. 30–Feb. 2, 1992, New York, New York. U.S.A., IEEE 1991.

"Dialog Search Abstract," date Oct. 12, 1995, pp. 1–8.
"Dialog Search Abstract," date Oct., 1995.

*Primary Examiner*—William Powell
*Attorney, Agent, or Firm*—Price, Gess & Ubell

[57] ABSTRACT

A micromachined pump including a channel formed in a semiconductor substrate by conventional processes such as chemical etching. A number of insulating barriers are established in the substrate parallel to one another and transverse to the channel. The barriers separate a series of electrically conductive strips. An overlying flexible conductive membrane is applied over the channel and conductive strips with an insulating layer separating the conductive strips from the conductive membrane. Application of a sequential voltage to the series of strips pulls the membrane into the channel portion of each successive strip to achieve a pumping action. A particularly desirable arrangement employs a micromachined push-pull dual channel cavity employing two substrates with a single membrane sandwiched between them.

26 Claims, 13 Drawing Sheets

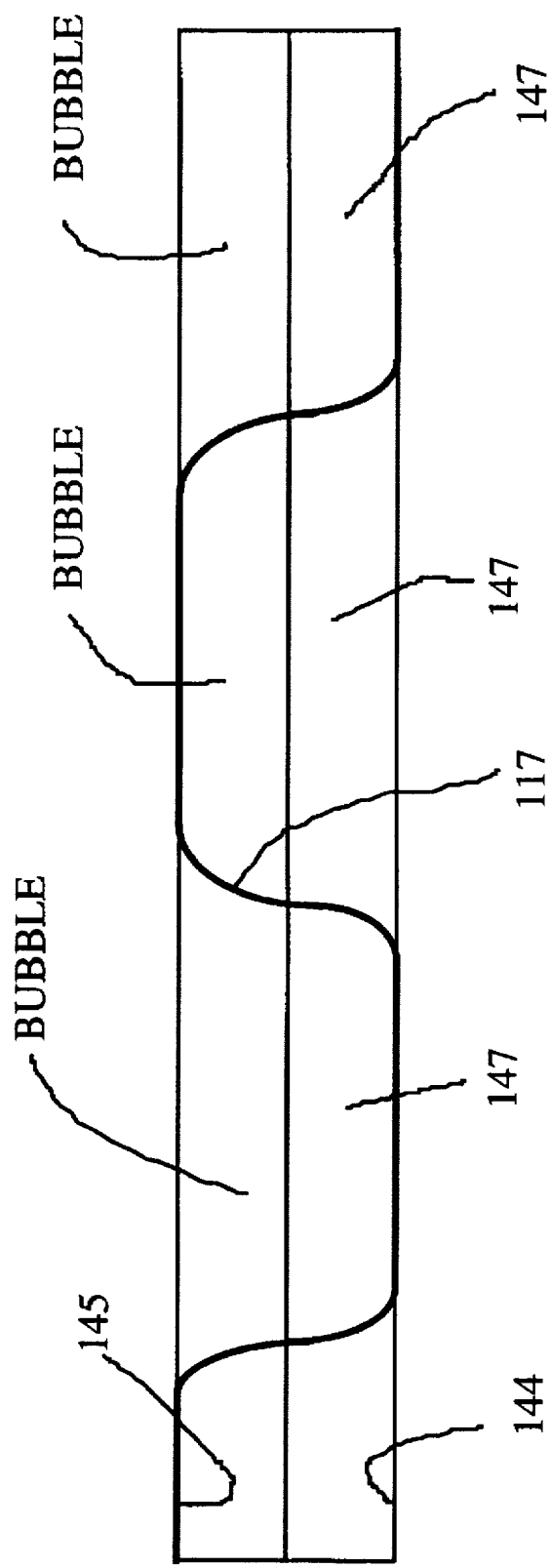

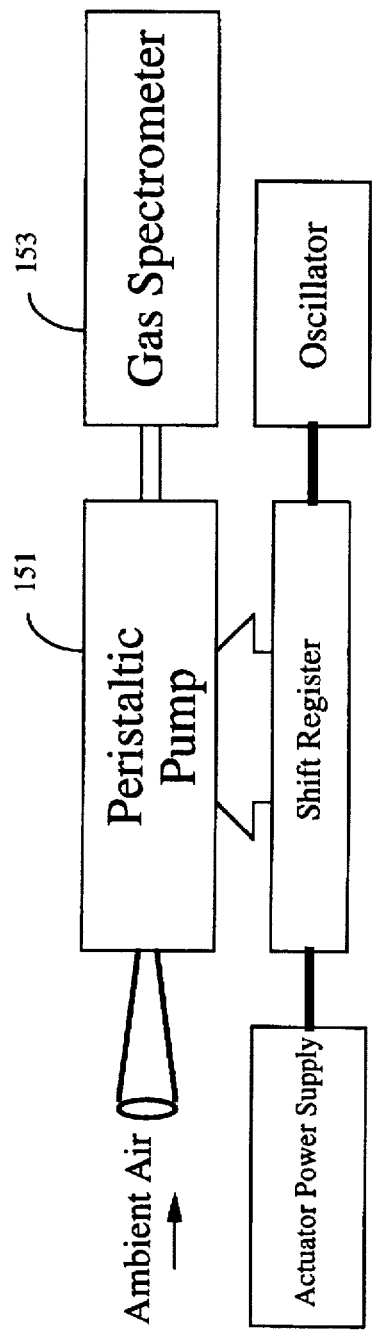
FIG. 11 Low Differential Pressure Gas Pump
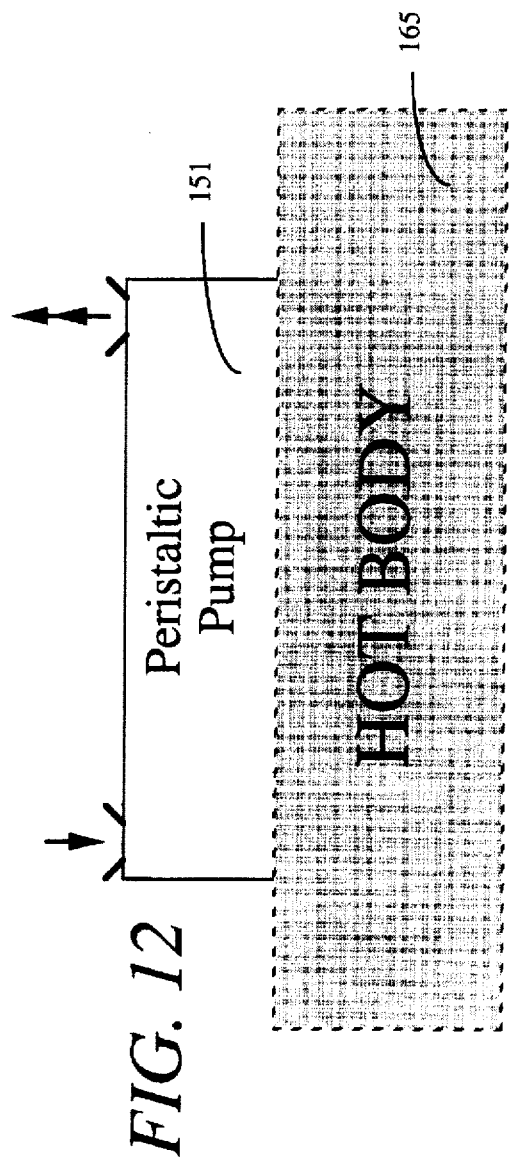
FIG. 12 Forced Convective Transfer Heat Exchanger

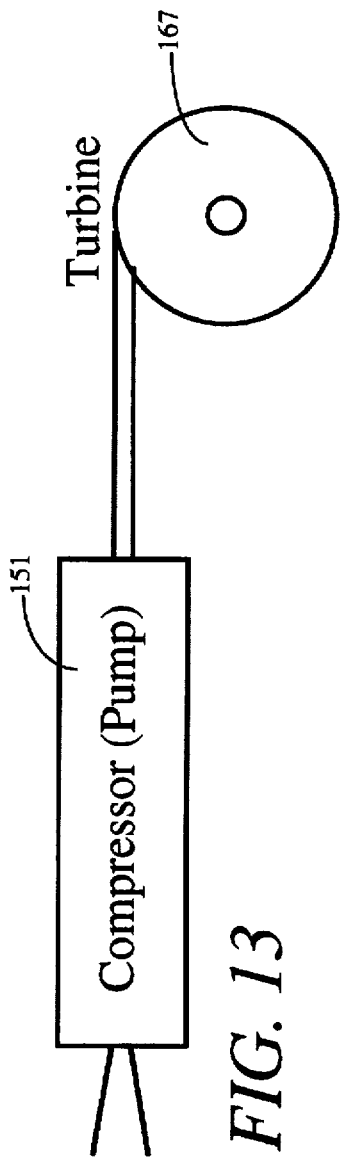
FIG. 13  Pneumatic Turbine Compressor
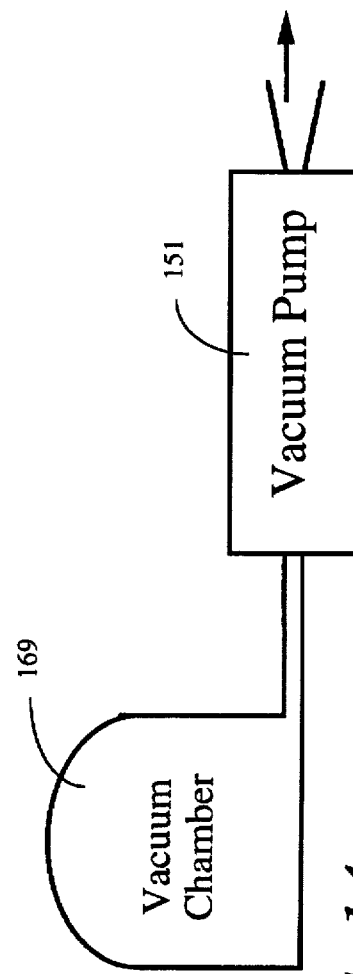
FIG. 14  Vacuum Pump

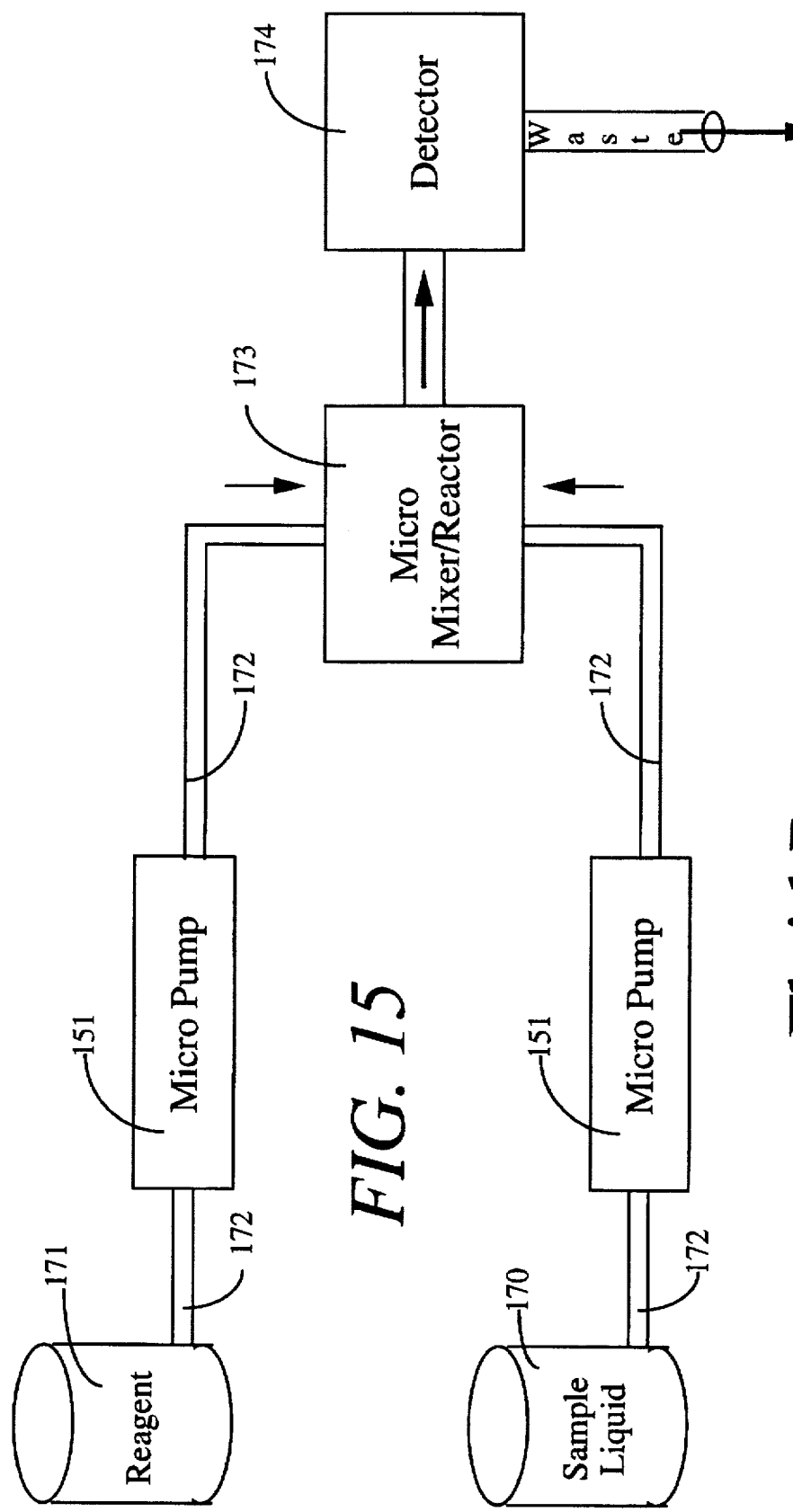

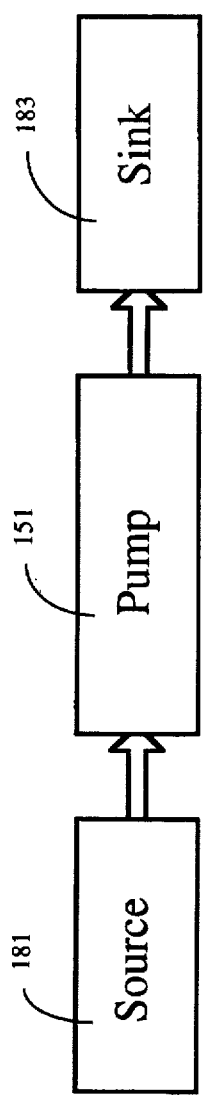
FIG. 16  Heat Pipe (thermal mass transfer)
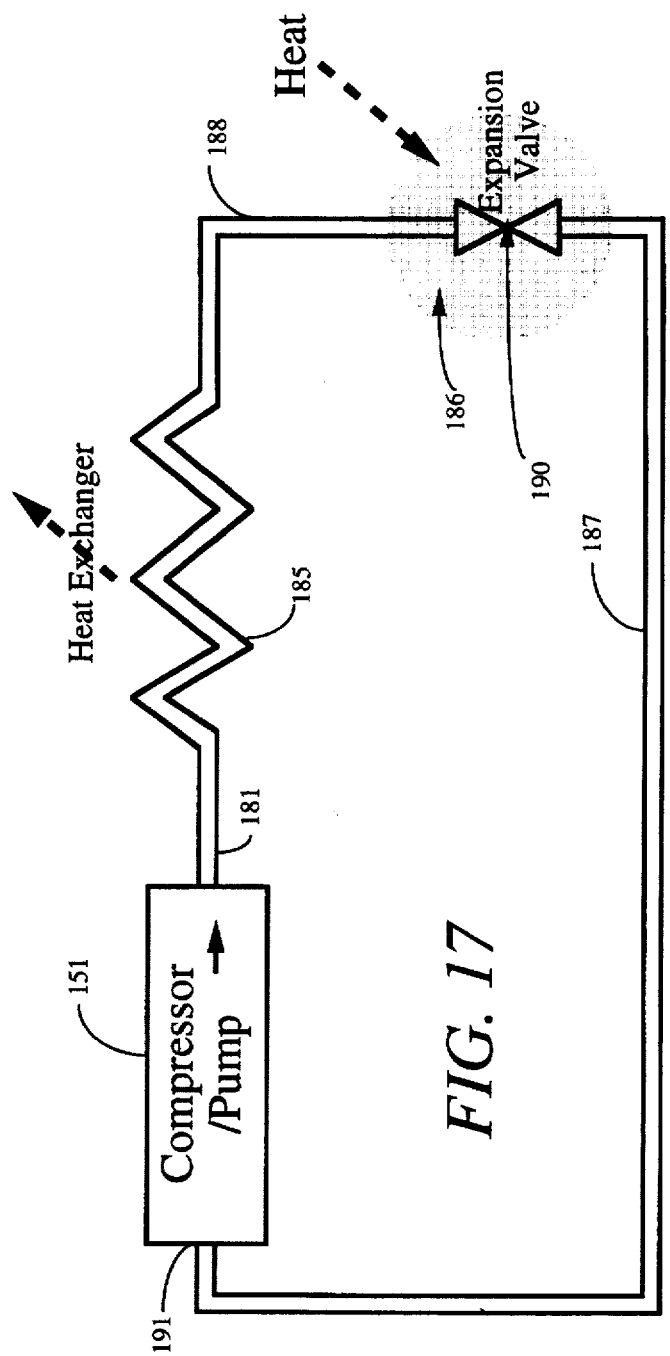
FIG. 17  Compressor for Phase Interchange Heat Pump/Refigerator Low Vibration Cryogenic Fluid Pump Fluidic Reaction Wheel Peristaltic Pump Shift Register High Pressure Valve

MICROMACHINED PERISTALTIC PUMP

This invention was made with Government support under Contract No. NAS7-918 awarded by NASA. The Government has certain rights in this invention.

BACKGROUND OF THE INVENTION

1. Field of the Invention

The subject invention relates generally to pumps and, more particularly, to a method and apparatus for microscopic scale pumping of a fluid employing a micromachined electrostatic pumping device.

2. Description of Related Art

As reported in the article "Peristaltic Pumping" by M. Y. Jaffrin and A. H. Shapiro (1971), peristaltic pumping is a form of fluid transport that occurs when a progressive wave of area contraction or expansion propagates along the length of a distensible tube containing a liquid. Physiologically, peristaltic action is an inherent neuromuscular property of any tubular smooth muscle structure. This characteristic is put to use by the body to propel or to mix the contents of a tube, as in the ureters, the gastrointestinal tract, the bile duct, and other glandular ducts.

Peristalsis is also the mechanism by which roller or finger pumps operate. Here the tube is passive, but is compressed by rotating rollers, by a series of mechanical fingers, or by a nutating plate. These devices are used to pump blood, slurries, corrosive fluids, and foods, whenever it is desirable to prevent the transported fluid from coming into contact with the mechanical parts of the pump. Generally the compression mechanism occludes the tube completely or almost completely, and the pump, by positive displacement, "milks" the fluid through the tube.

While the prior art has addressed various small electrostatic or piezo-driven pumps, no truly microperistaltic-type pump has been provided. Prior art proposals include devices employing triple chambers with valving, typically implemented with piezodevices. Such systems are not truly peristaltic.

OBJECTS AND SUMMARY OF THE INVENTION

It is therefore an object of the invention to provide a miniature pump;

It is another object of the invention to provide a miniature pump fabricated by micromachining techniques which are applicable to various substrates and especially those used in semiconductor fabrication; and It is another object of the invention to provide a micromachined pump which exhibits true peristaltic action.

These and other objects and advantages are achieved according to the invention by provision of a micromachined pump including a channel formed in a semiconductor substrate by conventional processes such as chemical etching. A number of insulating barriers are established in the substrate parallel to one another and transverse to the channel. The barriers separate a series of electrically conductive strips. An overlying flexible conductive membrane is applied over the channel and conductive strips with an insulating layer separating the conductive strips from the conductive membrane. Application of a sequential voltage to the series of strips pulls the membrane into the channel portion of each successive strip to achieve a pumping action. A particularly desirable arrangement employs a micromachined push-pull dual channel cavity employing two substrates with a single membrane sandwiched between them.

The invention provides a method and apparatus for microscopic scale pumping of a liquid or vapor fluid. The submicron precision with which micromachining can define structural dimensions and with which etch stops can regulate layer thickness enables the fabrication of minutely scaled structures in which significant and reproducible electrostatic fields are generated by low voltages. Additionally, the invention provides a method of facilitating significant convective heat flux by the forced flow of fluids through microchannels within a solid, as well as many other advantageous applications hereafter described.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

Figures 8, 9:
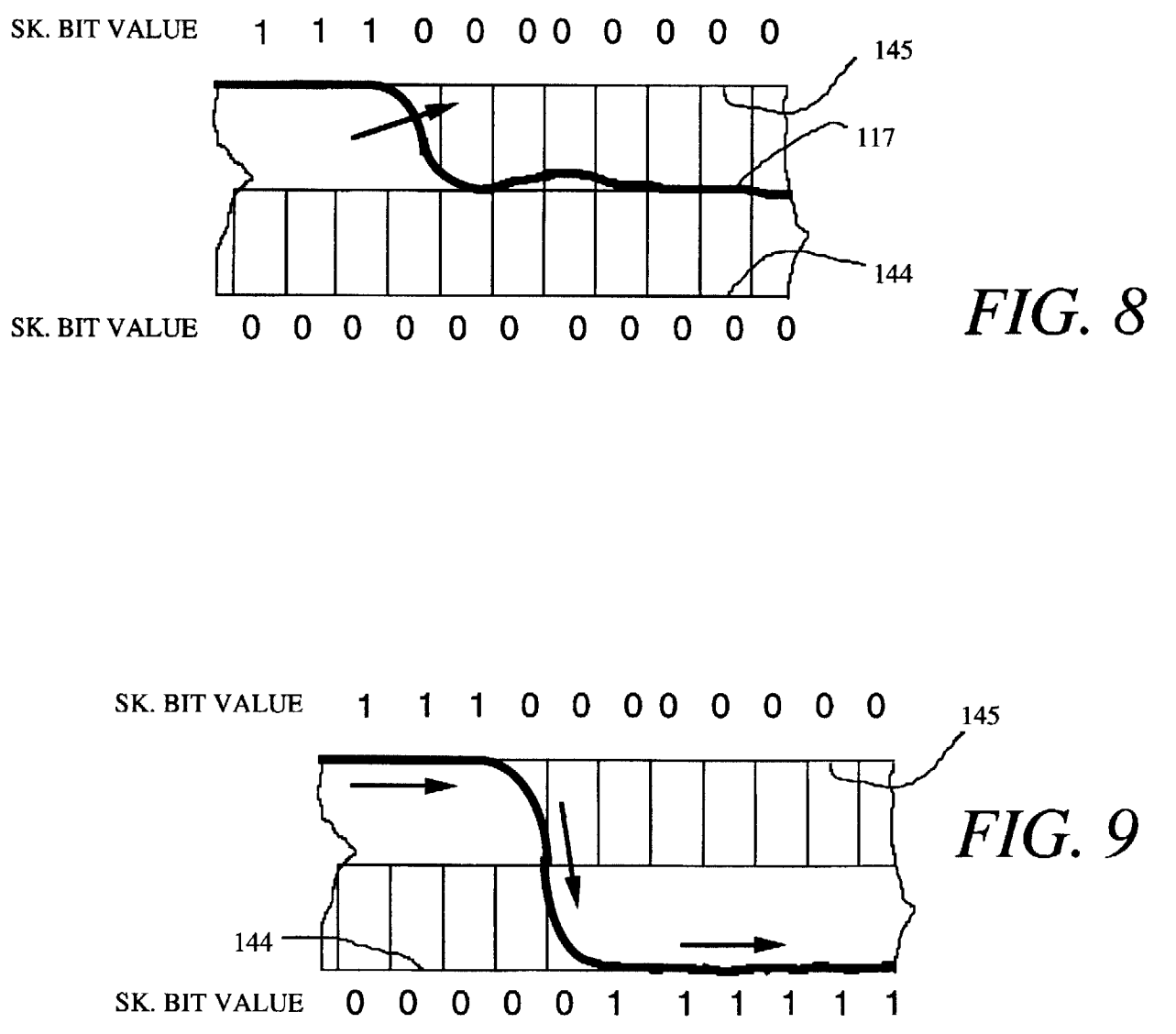

FIGS. 8 and 9 are partial side cross-sectional views illustrating sequential application of electrical signals down the channel of a micropump device according to the first and second preferred embodiments, respectively;

FIG. 10 is a partial side sectional view of a micropump channel according to the second preferred embodiment;

FIG. 11 is a schematic block diagram of a low differential pressure gas delivery system employing a micropump according to a preferred embodiment;

FIG. 12 is a schematic block diagram of a convective heat exchanger employing a micropump according to a preferred embodiment;

FIG. 13 is a schematic block diagram of a compressor according to a preferred embodiment;

FIG. 14 is a schematic block diagram of a vacuum pump according to a preferred embodiment;

FIG. 15 is a schematic block diagram of a fluid delivery system according to a preferred embodiment;

FIG. 16 is a schematic block diagram of a heat pipe according to a preferred embodiment;

FIG. 17 is a schematic block diagram of a sterling cycle engine according to a preferred embodiment;

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a particularly useful and widely applicable micropump structure.

Figure 1:
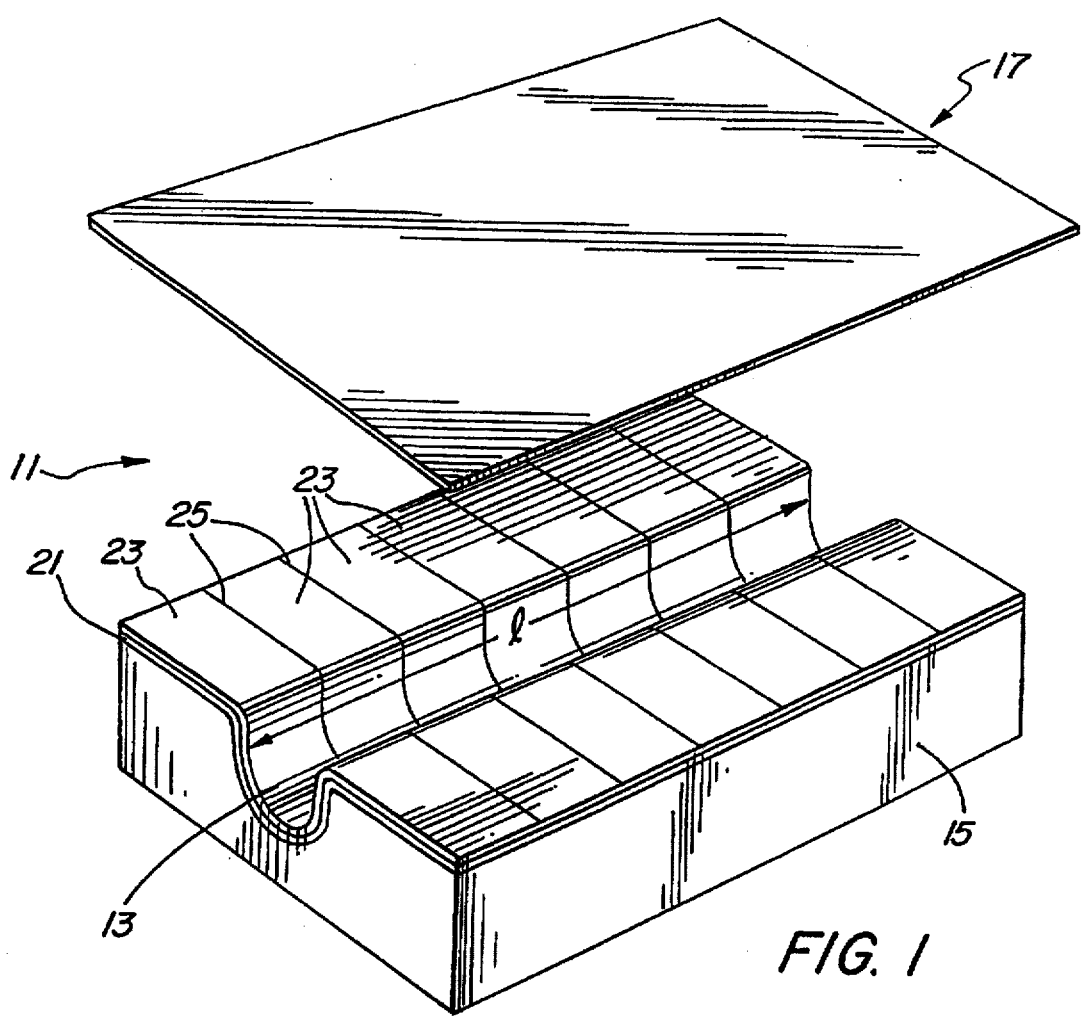
FIG. 1 is a perspective view of a micromachined pump according to a first preferred embodiment.

FIG. 1 illustrates one embodiment of an electrostatically driven peristaltic pump according to the present invention. A pump channel 13 is etched into a silicon substrate 15, lined with electrically conductive strips 21 whose top surfaces are covered with electrically insulating material 23. The strips 21 are separated from each other by electrically insulating barriers 25 formed transverse to the channel 13. The channel 13 is then covered by an electrically conductive flexible membrane 17.

Figure 2:
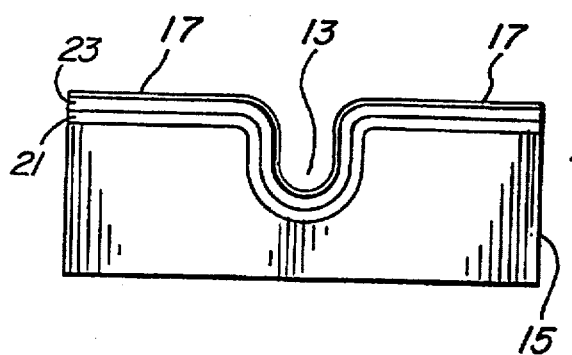
FIG. 2 is a cross-sectional view of the device of FIG. 1 with voltage applied.
Figure 3:
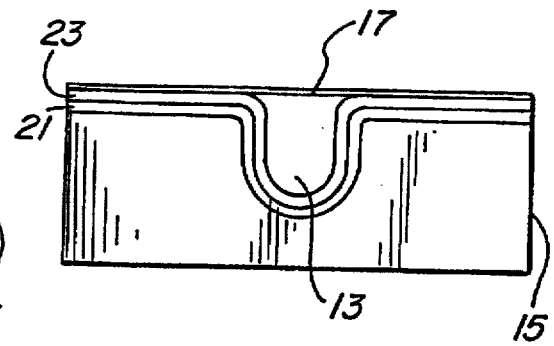
FIG. 3 is a cross-sectional view of the device of FIG. 1 with no voltage applied.

With no voltage applied, the membrane 17 is linear in cross-section and lies over the channel 13, as shown in FIG. 3. By applying a suitable voltage between the membrane 17 and each of the conductive strips 21 in succession, the membrane 17 can be electrostatically pulled into the channel 13, as shown in FIG. 2, at successive positions along the length "e" of the channel 13, thereby creating a peristaltic pumping action.

The characteristics and performance of the disclosed electrostatic actuated peristaltic pumps are principally dependent on the properties of the flexible membrane 17, which may exhibit an elasticity of about 30%. For low differential pressures and moderate temperatures a graphite impregnated polyurethane membrane material of thickness 5 μm is satisfactory. In vacuum applications, surface metallization of polyurethane membranes is necessary to reduce porosity. Higher voltages, such as 100 volts, are required to generate the electrostatic forces necessary to overcome the larger differential pressures, and high progression rates (500 m/sec) are required to pump nonviscous gases (vacuum pressures).

Figure 4:
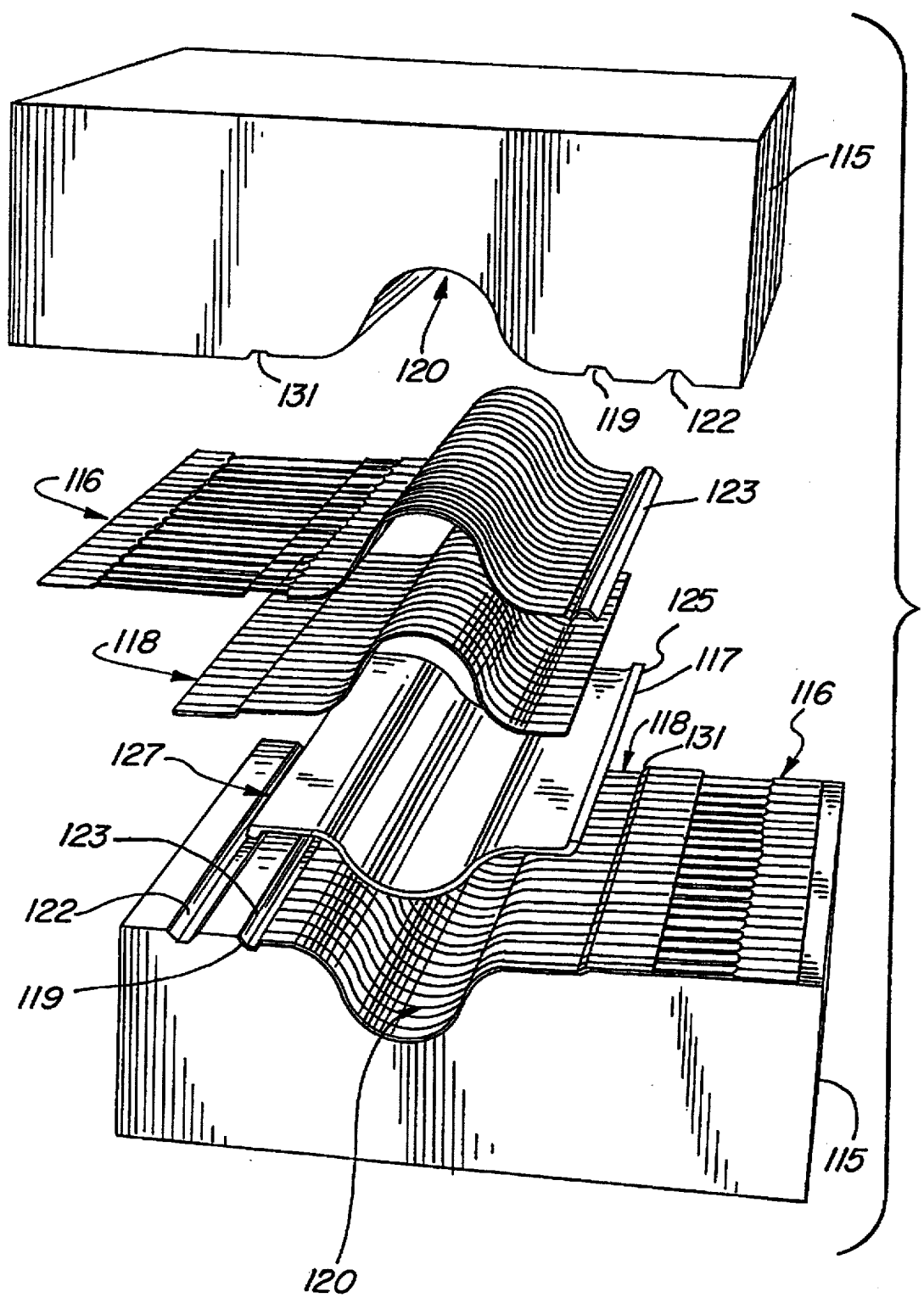
FIG. 4 is an exploded perspective view of a dual channel micropump according to a second preferred embodiment.
Figure 5:
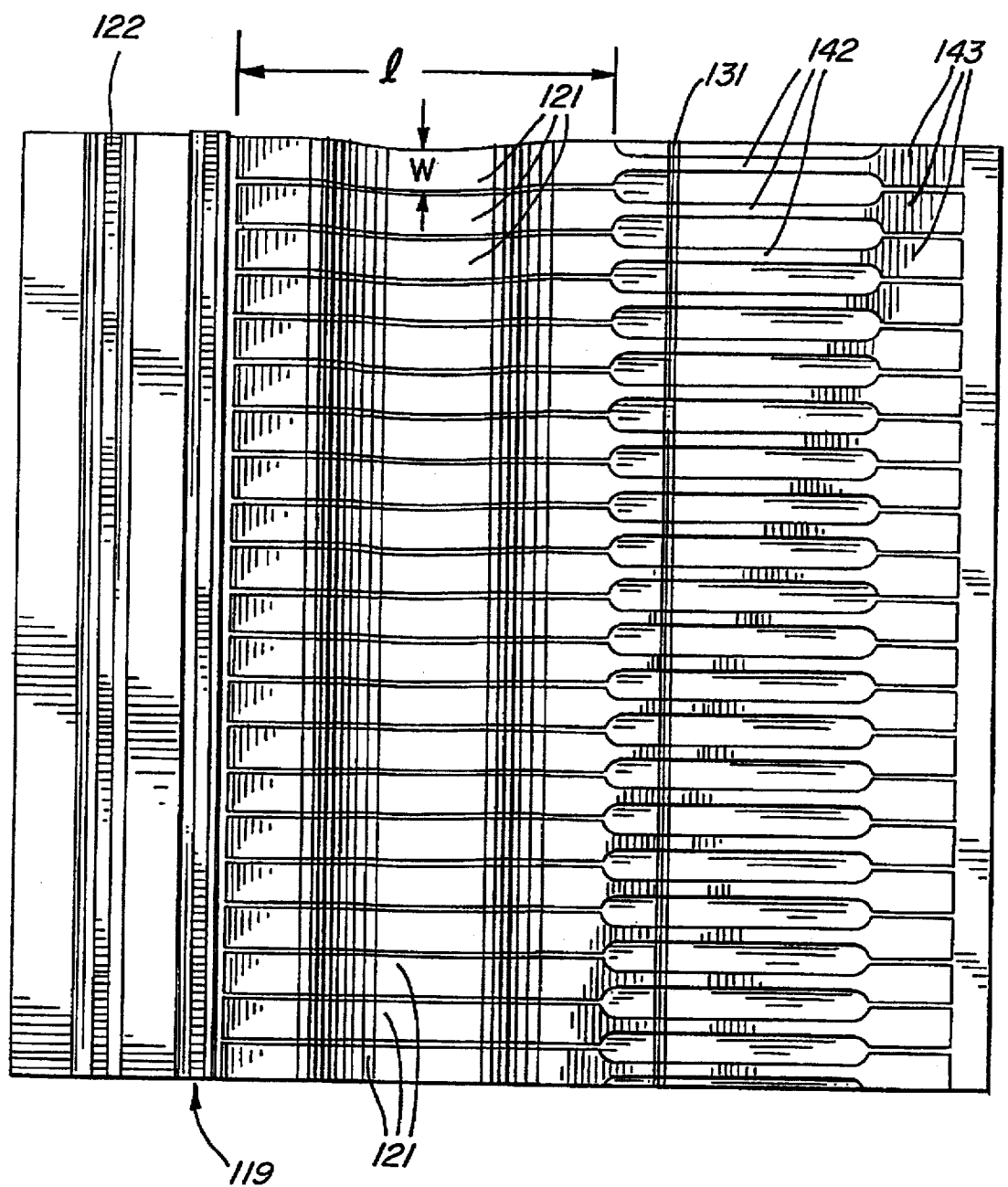
FIG. 5 is a top view of a conductive strip layer of a micropump according to FIG. 4.

FIGS. 4 and 5 illustrate the preferred push-pull dual cavity embodiment of a microperistaltic pump, where two silicon substrates 115 are placed together with a single membrane 117 sandwiched between them. The membrane 117 may again be graphite impregnated polyurethane. Between the membrane 117 and each substrate 115 are positioned respective conductive strip layers 116 and respective insulating layers 118. Each substrate 115 further has a linear conductor pit 119 and a bond metal trench 122 located adjacent one another and running parallel to a channel 120. While the thickness of the insulation layer 118 must be of submicron dimensions to ensure high electrostatic forces on the membrane 117, the channels 120 may be of millimeter dimensions.

A conductive strip layer 116 is shown in more detail in FIG. 5. The strip layer includes a number of actuator strip elements 121 which begin at the top edge of the channel 120 and traverse down the channel 120 and up the channel to its opposite edge. Thus, the substrate top surface curves down on either side to form a walled channel 120 having a radiused, concave, or rounded bottom portion such that no sharp edges are involved. The actuator strips 121 are rectangular conductor elements lying parallel to one another, transversely to the channel 120 and laid out down the length of the channel 120. They may be, for example, 0.1 millimeter in width "w" such that a group of 200 strips occupies about 20 millimeters. The space between the elements 121 is filled with insulation provided by an insulating layer 118 to provide interstrip insulation 3 which insulates each actuator element 121 from the next element 121. Thinner lead elements 142 lead away from each actuator element 121 to a respective conductive pad 143 which provides a wire bond pad for establishing electrical connection to a shift register pad or other electronic componentry. The actuator strips 121, leads 142, and pads 143 are preferably formed by etching a single deposited conductive metal layer such as a gold layer.

Each conductor pit 119 has a conductor channel 123 (FIG. 4) formed therein of conductive metal which establishes electrical connection to the membrane 117. The membrane 117 has complementary upper and lower lips 125, 127 (FIG. 4) on respective ends thereof which fit into and mate with a respective conductor channel 123 to both establish electrical connection to the membrane 117 and position and hold the membrane 117 in place when the two substrates 115 are bonded together and hermetically sealed with the assistance of bond metal placed in the bond metal trenches 122 between the substrates 115 and the insulation layers 118 as described below. A ledge 131 is further formed on each substrate 115 parallel to the channel 120 in order to provide for membrane thickness and permit some squeezing to hold the membrane 117 in position.

Micromachining techniques have evolved from the microelectronics industry. Both the additive processes of thin film deposition or vapor deposition and the subtractive processes of chemical or plasma etching are appropriate for the manufacture of both the channels and pump. The bulk etching of channels in silicon, quartz, or other suitable substrate, whether semiconductor, metallic, or otherwise, and its fusing to a mirror image wafer is one technique of creating a microperistaltic pump. Surface micromachining may also be deployed where a patterned sacrificial profile of the channel is created over which the actuator and insulation materials are deposited.

Isotropic etching techniques are employed in an illustrative implementation of the micropump to create a smooth, contoured concave channel 120. Once this channel and other grooves 119, 120, 122 and ledges 131 have been created, a metal layer of a few hundred Angstroms (Å) in thickness is vapor or sputter deposited evenly over the whole top surface of substrate 115. An even layer of photoresist is then applied and a photo mask is thereafter used to define the etch barriers to form the metal actuator strips 121, leads 142, pads 143, and conductive membrane connection channels 123 (FIG. 5). The comparatively large depth of field required for submicron definition of the actuator elements 121 in the channel 120 requires special care.

Following the etching and removal of the photoresist, a vapor epitaxial deposit of a micron of silicon dioxide, or like insulation material, is required to form the insulation layers 118. The insulation layers 118 provide the insulation between the actuator strips themselves, the insulation between the actuator strips 116 and the membrane 117, and the insulation between the strips 116 and the bond metal to be placed in the bond metal trenches 122.

Figure 6:
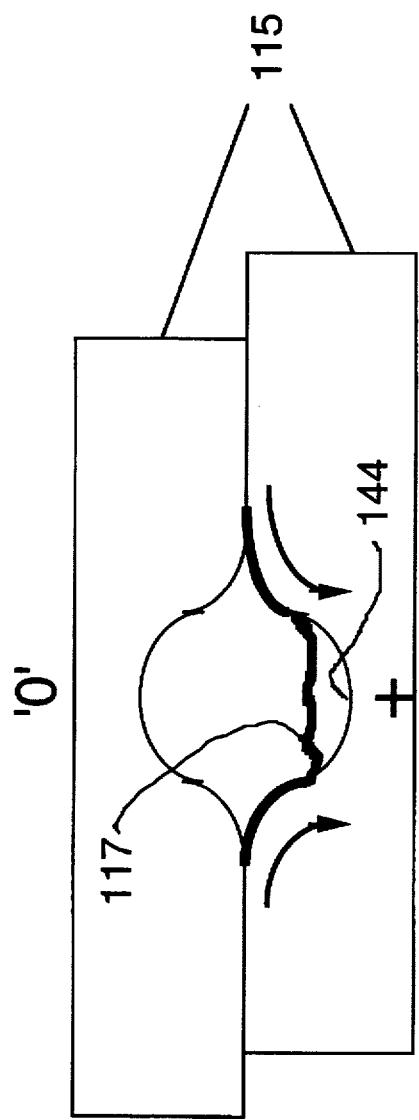
FIGS. 6 and 7 are schematic end views illustrating the operation of a push-pull pump according to the second preferred embodiment.
Figure 7:
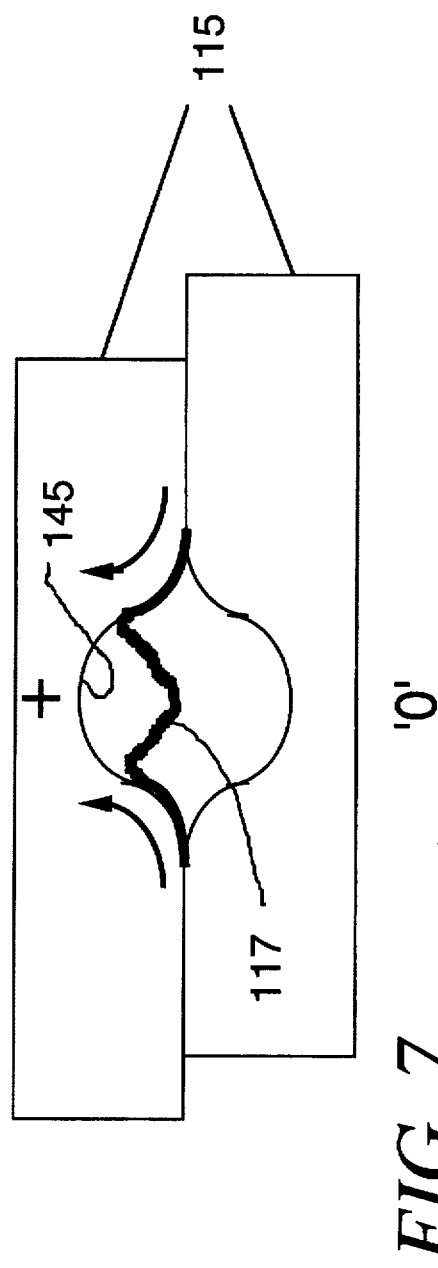

After annealing the material to consolidate the insulation layer 118, another photoresist coating is applied and then another photo mask in order to define the membrane connection channel 123 and insulation profile, e.g. to expose the conductive strip connection pads 143. The final wafer processing step involves the vapor or sputter deposition of a column of interwafer bond metal in the bond metal trenches 122, for example, utilizing a shadow mask. The pump die shells or substrates 115 are then cut from their wafer, the flexible membrane 117 placed between two shells 115, and the assembly clamped together and placed in an oven until the bond metal melts, pulls the two dies together, and fuses the two dies 115 together to form a solid structure hermetically sealed down both sides by the bond metal, such as illustrated in FIG. 6. A typical bond metal is a mixture of gold and germanium.

Where the membrane 117 is clamped, it is in intimate contact with the thin insulation layer 118 of both shells 115. Hence, when a voltage is applied between an actuator element 121 and the membrane 117, an electrostatic attraction force, proportional to the square of the applied voltage and the inverse square of the insulation thickness (<1 micron), pulls the membrane 117 down. The membrane 117 rolls down the surface 144 of the insulation (FIG. 6), due to the fact that the greatest attractive forces are generated where distances from conductive strips 121 are the smallest (i.e. insulation thickness). Conversely, when a voltage is applied to the strip 121 in the upper shell 115, the membrane 117 rolls up its channel surface 145. As seen in the cross-sectional view down the channel of FIG. 8, when a neighboring conducting strip 121 is energized the membrane 117 rolls forward (FIG. 8) and down across the activated elements. The membrane 117 is initially drawn up onto the upper channel surface 145 (FIG. 9) and advanced along the channel 120, then the membrane 117 is released for several periods (zeros) before the membrane 117 is drawn down into the lower channel 120 and then rolls down the lower channel surface 144. Thus, a membrane "wall" is placed across the composite channel. By connecting the actuator elements 121 up to the outputs of a shift register vial leads 142 and pads 143, a clocked bit stream of "1s" or "0s" apply a voltage or no voltage with respect to the membrane 117, respectively, to the actuator elements 121 along the channel 120 in a sequential manner. This actuation progression provides a miniature peristaltic pump.

In the case of the preferred embodiment of a dual channeled pump, dual shift registers are required where the bit streams are interlaced and interlocked such that a membrane wall is advanced down channel. By alternate inversions of the bit streams sequences, multiple membrane "bubbles" 147 will move down the channel (FIG. 10), pushing the entrapped fluid in front of each membrane "wall" and pulling the fluid behind each membrane "wall."

This disclosed pump architecture represents a true two-dimensional analog of the three-dimensional peristaltic mechanisms that are endemic in living organisms. It is valveless and impervious to gas bubble entrapment that has plagued other attempts at miniature pumps. It also does not require priming and can tolerate the adherence of small foreign articles (small compared with cavity dimensions) on channel or membrane surfaces. The pump is self-purging, tending to push everything before the membrane 117 in its intimate rolling motion across the channel surface. Its performance is gracefully degraded by the adherence of small foreign particles, with the membrane 117 still progressing along the channel 120, but with less attractive force when across the particle due to the greater distance of that portion of the membrane 117 from the underlying conductive strip 121.

It is presently not certain as to whether an electrostatic peristaltic pump according to the preferred embodiment can only function with fluids that are electrically nonconductive. If not, magnetic renditions might be considered for electrically conductive fluids, but these would be more complex, require significantly greater amounts of power, and function over a more restrictive temperature range.

The disclosed pumps have a number of advantages. At micron dimensions small voltages create high electric fields over small distances which, in turn, are capable of generating substantial electrostatic forces. Electrostatic actuators consume no power (fractions of mW at high frequencies) and function from absolute zero to the eutectic melting temperatures of interwafer bonding materials.

Several applications for microperistaltic pumps according to the preferred embodiment have been identified, specifically: low differential pressure gas pump, forced convective transfer heat exchanger, pneumatic turbine compressor, vacuum pump, fluid pumps, heat pipe (thermal mass transfer), compressor for phase interchange heat pump/ refrigerator, low vibration cryogenic fluid pump, fluidic reaction wheel, and high pressure valve.

The simplest application of a microperistaltic pump is a low differential pressure gas delivery system (FIG. 11). For example, such a pump 151 could draw gas from an environment of interest and feed it through a gas analyzer 153. This might be to analyze the ambient air for CO or to search for gas leaks, or to draw automobile exhaust gas to monitor hydrocarbon output. A further application might be to sample dust, soot, pollen, or small insects by drawing air through a filter or array of small channels.

In the application of FIG. 11, the gas flow rate through the pump 151 is also measured indirectly by knowing the effective cross-section of the pump 151, the pitch of the conductive strips 121, and the progression rate of strip excitation (oscillator clocking frequency). The mass flow rate is also known if the exhaust gas temperature and pressure are measured.

At high flow rates significant convective heat fluxes, and thus intimate thermal coupling, are achieved by the forced flow of fluids through microchannels within a solid. A forced convective heat exchanger may thus be provided as shown in FIG. 12 by micromachined channels 120 in a thermally conductive material of a pump 151, which channels are constructed in such a way as to maximize surface area. Fluid flow through these channels 120 provides effective convective coupling to the channel surface. Duct size and the flow velocity need to be selected to provide for optimum heat transfer efficiency between the gas and the pump. This inventor presently knows of no known existing method of facilitating significant convective heat flux by the forced flow of fluids through microchannels within a thermally conductive solid.

Microdimensional solids exhibit small thermal conductive loss, and high velocity gases traveling through microdimensional channels exhibit small thermal convective loss. This provides high thermal coupling between solid and fluid. Microstructured pump-channel implementation on a substrate, complete with drive electronics, results in a "breathing skin" with a high thermal transfer coefficient. In a nonvacuum environment, such pumps draw from still air at the surface and expel away from the surface. The heat pump is not dependent on density gradients and gravity fields as are conventional convective heat sinks, etc. They may therefore be used in space (i.e., shuttle, space station). With many pump-channel cells per square centimeter, the devices may be bonded to the surfaces of integrated circuit chips ("hot body" 165) to dissipate their heat directly: no forced ventilation, no orientation constraints, no noise, and no moving parts. The pump-channel cell substrate may be bonded to the surface of power packs or system chassis in large area slabs to remove heat as an alternative to natural convection heat sinks or ducted air circulation.

Where multiple membrane "bubbles" are moving down the channels the pump exhibits a multi stage characteristic where the differential pressures across each membrane "bubble" may be cascaded cumulatively across the pump.

At high flow rates and moderate pressures the pump 151 may function as a compressor (FIG. 13). Such a compressor may drive a pneumatic turbine 167 enabling a useful class of small rotational mechanisms. Examples of these mechanisms are dental drills, miniature gyroscopes, rotating shutter systems, etc. Such a compressor may also be used to inflate small structures or via an isolation membrane or syringe plunger to dispense precise volumes of drugs or reagents.

At high membrane progression rates and high differential pressures the device may function as a vacuum pump 151 for evacuating a chamber 169 (FIG. 14). In such applications surface metallization of polyurethane membranes would be necessary to reduce porosity. Higher voltages would also be required to generate the greater electrostatic forces that are required to overcome the larger differential pressures and high progression rates required (500 m/sec) to pump non-viscous gasses (vacuum pressures).

For vapor phase pumps the pitch of the strip actuators may also be progressively increased to provide a staged pressure build up along the channel. This compression build-up would be particularly beneficial where gas/liquid phase changes occur.

The growing trend in biotechnology toward automation and miniaturization of components and reagent consumption is elevating interest in micro-fluidics, particularly the need for physically small pumps, valves, and mixing chambers. Microfabricated "lab-on-a-chip" instruments are emerging for conducting electrophoresis, radiography, protein sequencing, DNA diagnostics, and genotyping that require sample and reagent delivery systems capable of regulating volumes in the 10–1000 nanoliter range. Miniature biosensors and drug delivery systems are other arenas requiring microfluidic pumps, valves, pipes, and vessels. FIG. 15 shows a pair of micromachined peristaltic pumps 151 arranged to deliver a reagent from a reservoir 171 and a sample liquid specimen from a supply source 170 through micro-machined delivery channel sections 172 to a reaction chamber 173. The reaction chamber 173 may output to a detector 174.

In configurations like FIG. 15, such pumps 151 can deliver and measure minuscule volumes of "incompressible" liquids and at precisely determined times or time intervals, for example, by actuating the membrane at times recorded in the memory of a programmed digital processor or computer. The precision with which volumes can be measured (or delivered) by the disclosed microperistaltic pump is that associated with a single stepped advance of an actuator strip. This minimum volume is thus defined by the product of the channel cross-section and actuator pitch. For example, a relatively large channel, by micromachining standards, with a cross-section of 0.5 mm$^2$ and an actuator pitch of 0.1 mm has a minimum volume displacement of 50 nanoliters. By micromachining standards, this is a large pump.

In continuous flow microreaction cells, separate pumps may be used for each reagent and respectively run at clocking rates that are proportional to the required concentration ratios. In batch mode operation, specific volumes of reagents may be metered by providing sufficient clock pulses to deliver the necessary number of minimum volume displacements. When the pump is operated in the static or intermittent mode the "across channel" membrane functions as a valve. If reaction cells input ports are directly coupled to pumps the membrane "valves" can isolate the cell against appreciable back pressure and for an indefinite period between successive deliveries of metered volumes of reagent.

Effective thermal conductivity of active heat pipes is markedly superior to that of the best passive thermal conductive materials. A micropump 151 may be used to circulate a fluid between a thermal source 181 and sink 183 as shown in FIG. 16, effectively transferring heat both within the circulating medium by thermal mass transfer and between the medium and the source and sink by improved convective transfer. At high flow rates significant convective heat fluxes, and thus intimate thermal coupling, are achieved by the forced flow of fluids through micro-channels within a solid.

Thermal transfer capacity is further enhanced by the absorption or dissipation of latent heat generated from gas/liquid or liquid/gas phase transitions. These phase transitions can be orchestrated by pumping where compression liquefies and evacuation vaporizes. The Carnot vapor compression cycle defines such a heat engine. In a micromachined version of a closed loop sterling cycle as shown in FIG. 17, the whole engine, or a serial cascade of sterling engines, may be fabricated from two fused wafers. A miniature peristaltic pump 151 draws refrigerant vapor and compresses it into its liquid phase. The liquid, heated from the liberated latent heat, is then cooled by convective transfer into the surrounding substrate microchannel 181 and onto a highly thermally conductive heat exchanger 185 created in the substrate. Another microchannel 188 conducts the cooled liquid refrigerant to an expansion nozzle 190 in a thermally isolated cold pad 186, where the refrigerant expands into its vapor phase, drawing the latent heat of evaporation from the cold pad 186. This cold vapor is conveyed in yet another microchannel 187 to the inlet port 191 of the miniature peristaltic pump 151. The peristaltic pump 151 exhibits very low vibration, as it has no reciprocating parts, but instead has a very low mass membrane that rolls across the surfaces of the channels, e.g. 144, 145. A micromachined version is thus ideally suited to cooling long wavelength infrared detectors. Equipped with low porosity and low temperature membranes, micromachined peristaltic pumped Carnot engines are capable of cooling imaging detectors from room temperature to around 70° K.

Figure 18:
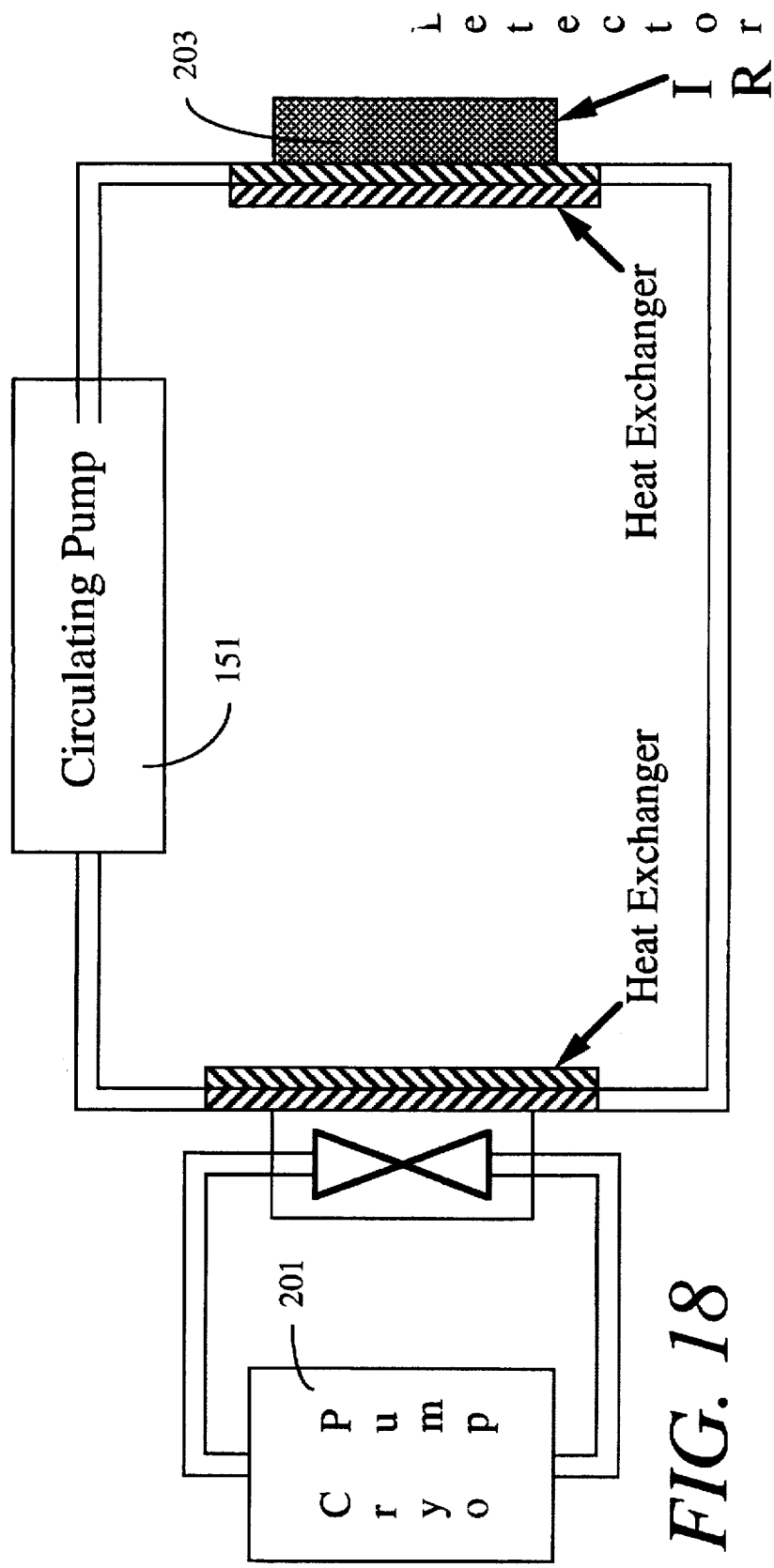
FIG. 18 is a schematic block diagram of a cryopump system according to a preferred embodiment.

It is questionable whether a micromachined peristaltic pump could generate the hundreds of PSI required of the hydrogen cycle cryogenic heat exchangers. The need for tight thermal coupling between conventional cryogenic pumps and imaging objectives compromises the level of pump vibration that an objective can endure. However, as shown in FIG. 18, a small peristaltic pump 151 can provide the tight thermal coupling between a cryopump 201 and an objective (infrared detector) 203 without vibration coupling. To operate at cryogenic temperatures a polymer membraned peristaltic pump would be required.

Figure 19:
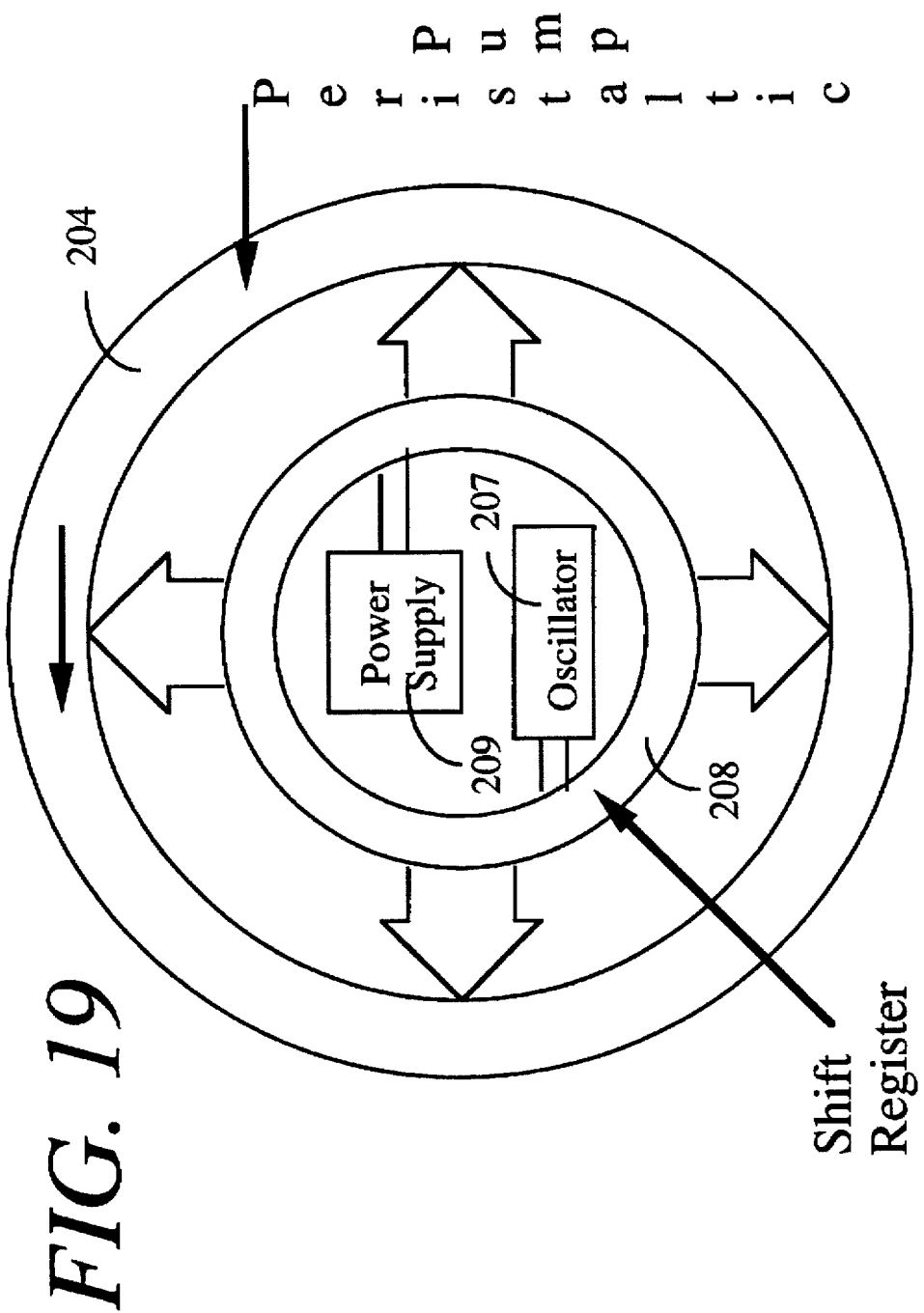
FIG. 19 is a schematic block diagram of a reaction wheel according to a preferred embodiment.

Conventional reaction wheels consist of electric motor driven fly wheels where the precession generated by fly wheel momentum changes, due to changes in angular velocity, provide corrective forces for stabilizing space craft. There are no known existing methods of producing micron scale motors or rotational members for incorporation in "micro" reaction wheels. A closed circular version 204 of a micromachined peristaltic pump may be manufactured as shown in FIG. 19, complete with convenient electrical interfacing, to provide an extensive range of flow rates. The entire circular channel is lined with radially-arrayed conductor elements, e.g. 121, and driven by a shift register 208 and cooperating oscillator/power supply 207, 209. The circulation of a dense fluid in a smooth contoured isotropically etched circular channel of the pump 204 mimics the function of a reaction wheel. Precession forces now result from changes in fluid flow rates within the channel or channels.

Figure 20:
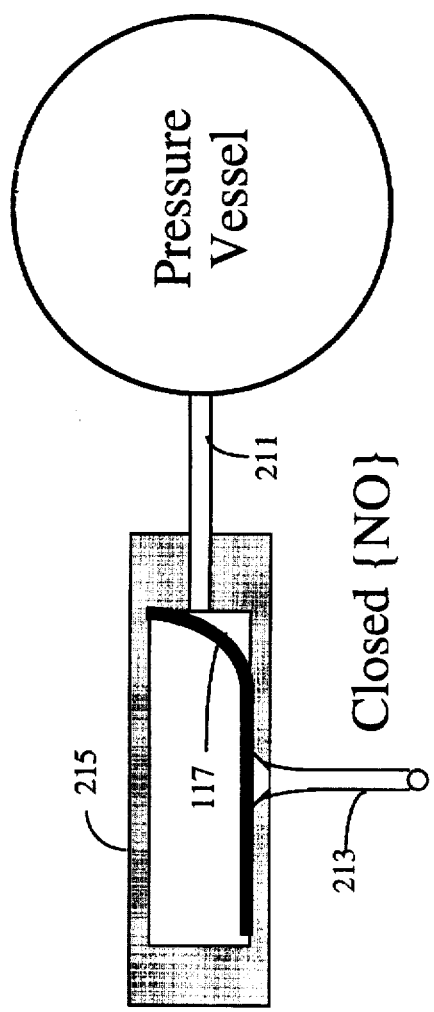
FIGS. 20 and 21 are schematic block diagrams of a valve according to a preferred embodiment.
Figure 21:
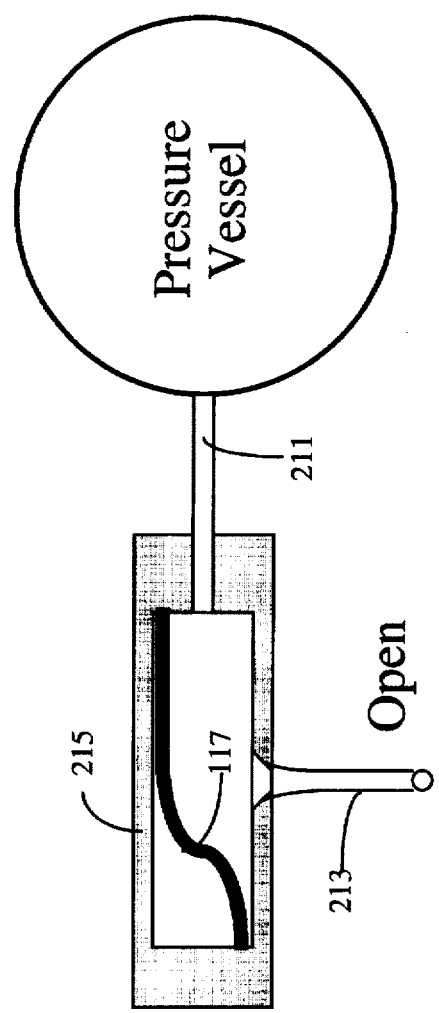

The large electrostatic forces generated on a membrane across a thin layer of insulation has other applications aside from a peristaltic pump. If the membrane cross-section is small, then significant pressures are required to separate the membrane from or prevent the membrane attaching to the channel surface. Multiple strip conductors can increase withhold pressures and reduce propensity toward valve leakage. With 100 volts across insulation between the membrane and conductive strip actuators and a small membrane cross-section, a "normally open" valve, FIGS. 20 and 21, capable of withholding hundreds of PSI pressure may be realized. The closing pressure limit is determined by the effective area of the membrane and the electrostatic force generated across the thin insulation layer. The valve ports 211, 213 may be at either end of a pump-like channel 215, perpendicular to a channel and perforating a conductive strip or one perpendicular and one parallel. Because the valve actuator is electrostatic and draws no current, little power, aside from maintaining potential, is required to keep the valve closed.

To summarize, some of the advantages and areas of application of the invention are as follows:

1. The miniature peristaltic pump can be used to transport fluids (or vapors) over an extensive range of flow rates.
2. The suggested implementation of the pump doubles as a positive displacement flow meter, thus the mass flow rate and angular momentum can be measured directly.
3. Microstructured pump-channel implementation on a substrate, complete with drive electronics, results in a microreaction wheel.
4. Many of these channels may be organized in concentric circles and some of them operated in opposite directions to maximize momentum change.
5. The electrostatic actuator mechanism requires potential but no current thus it requires little power and therefore generates virtually no heat. There are no orientation constraints, no noise and no moving parts.
6. The pump-channel cells need be of the largest diameter possible for maximum angular momentum. In a fully integrated space craft architecture the inner area of the substrate would be used for electronics or other MEMS devices.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A miniature pump structure comprising:
   a substrate having a channel therein;
   a series of conductive strips separated by insulative barriers formed in said channel, said strips and barriers lying transverse to said channel;
   a flexible conductive membrane located over said channel; and
   an insulative layer positioned over said conductive strips and between said strips and said membrane.
2. The pump structure of claim 1 wherein said channel has first and second sidewalls and a rounded bottom.
3. The pump structure of claim 1 wherein said substrate comprises a semiconductor substrate.
4. The pump structure of claim 2 wherein said membrane comprises a graphite impregnated polyurethane membrane.
5. The pump structure of claim 2 wherein said membrane comprises a polyurethane membrane having metallization applied to at least one surface thereof.
6. The pump structure of claim 1 wherein said membrane has an elasticity of 30%.
7. The pump structure of claim 1 further including means for applying a selected voltage to each of said strips in succession so as to create a peristaltic pumping action.
8. The pump structure of claim 1 wherein said membrane comprises a flexible polymer structure.
9. The microminiature pump structure comprising:
   a substrate having a channel formed therein;
   a flexible conductive membrane affixed on said substrate over said channel; and
   means for attracting said membrane into said channel so as to contact a region of said channel and for causing the region of contact between said channel and said membrane to move down said channel so as to create a pumping action.
10. The pump structure of claim 9 wherein said channel further includes an inlet end and an output end, said inlet end being arranged to receive an ambient gas atmosphere and said outlet end being connected to supply ambient gas pumped from said atmosphere to a means for analyzing the chemical makeup of said gas atmosphere.
11. The pump structure of claim 10 wherein said means for analyzing is a gas spectrometer.
12. The pump structure of claim 9 wherein said substrate comprises a heated thermally conductive material and further including means for supplying a cooling fluid for circulation through said channel so as to effect convective coupling to the substrate, thereby enabling cooling of the substrate.
13. The pump structure of claim 9 further including a pneumatic turbine having a driving port connected to an output end of said channel and wherein said means for attracting further functions to pump air through said channel so as to drive said pneumatic turbine.
14. The pump structure of claim 9 wherein said channel has an inlet end connected to an output port of a vacuum chamber and wherein said means for attracting further functions so as to evacuate said vacuum chamber.
15. The structure of claim 9 further including means for connecting an inlet end of said channel to receive a liquid chemical input from a liquid chemical supply and means for connecting an outlet of said channel to a reaction chamber means, whereby said pump structure functions to transport said chemical to said reaction chamber.
16. The structure of claim 15 further including a second pump structure comprising a second substrate, a second flexible membrane, a second channel, and a second means for attracting said membrane into said second channel so as to contact a region of said second channel and for causing the region of contact between said second channel and said membrane to move down said second channel so as to allocate a second chemical to said second reaction chamber.
17. The pump structure of claim 9 further including a thermal source and a thermal sink and wherein said channel is disposed such that said means for attracting circulates a fluid between an output of said thermal source and an input of said thermal sink.
18. The pump structure of claim 9 wherein said channel is connected to a source of refrigerant vapor and said means for attracting further operates to compress said vapor into its liquid phase.

19. The pump structure of claim 18 and further included in a means for creating a closed loop sterling cycle.

20. The pump structure of claim 9 including means for adapting said pump structure to provide tight thermal coupling between a cryogenic pump and an imaging objective.

21. The pump structure of claim 9 wherein said channel is circular and said means for attracting further operates so as to create a fluidic reaction wheel.

22. The pump structure of claim 9 and wherein said means for attracting is operated so as to selectively close and open a fluid path between an inlet to said channel and an output created in said substrate.

23. The pump structure of claim 9 wherein said means for attracting further generates a measure of flow rate through said channel.

24. A miniature pump comprising:

first and second substrates, having respective first and second channels formed therein and positioned to lie opposite one another when said first and second substrates are positioned adjacent one another;

a first array of conductive actuator elements located on said first substrate, each element traversing said first channel;

a second array of conductive actuator elements located on said second substrate, each element traversing said second channel;

respective first and second insulation layers formed over said first and second arrays of actuator elements;

a flexible electrically conductive membrane; and means for connecting said substrates together such that the first and second channels lie opposite one another with said membrane sandwiched between said first and second insulation layers.

25. The pump of claim 24 wherein said means for connecting comprises;

first and second bond metal trenches lying parallel, respectively, to said first and second channels; and bond metal means in said first and second trenches for forming a hermetic seal between an insulation layer and a substrate surface.

26. The pump of claim 25 further including a respective conductor channel means in each substrate for establishing electrical connection to said membrane.

* * * * *